(12) United States Patent
Sinha

(10) Patent No.: US 9,220,063 B2
(45) Date of Patent: Dec. 22, 2015

(54) POWER MANAGEMENT FOR DATA TRANSFERS IN NETWORK DEVICES

(71) Applicant: BROADCOM CORPORATION, Irvine, CA (US)

(72) Inventor: Rajesh Kumar Sinha, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 122 days.

(21) Appl. No.: 13/651,076

(22) Filed: Oct. 12, 2012

(65) Prior Publication Data

US 2014/0105082 A1 Apr. 17, 2014

(51) Int. Cl.
*H04W 52/02* (2009.01)

(52) U.S. Cl.
CPC ...... *H04W 52/0216* (2013.01); *H04W 52/0229* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,245,946 B2* | 7/2007 | Liu | 455/574 |
| 7,551,948 B2* | 6/2009 | Meier et al. | 455/574 |
| 7,995,507 B2* | 8/2011 | Singh et al. | 370/311 |
| 8,451,761 B2* | 5/2013 | Seok | 370/311 |
| 2003/0152059 A1* | 8/2003 | Odman | 370/338 |
| 2007/0230338 A1* | 10/2007 | Shao et al. | 370/230 |
| 2008/0130540 A1* | 6/2008 | Singh et al. | 370/311 |
| 2008/0165709 A1* | 7/2008 | Soliman | 370/280 |
| 2010/0195552 A1* | 8/2010 | Ho | 370/311 |
| 2010/0309845 A1* | 12/2010 | Jeon et al. | 370/328 |
| 2010/0317388 A1* | 12/2010 | Chu et al. | 455/509 |
| 2011/0038290 A1* | 2/2011 | Gong et al. | 370/311 |
| 2011/0199952 A1* | 8/2011 | Seok | 370/311 |

OTHER PUBLICATIONS

Solomon et al. (WGA Specification; Published on Jan. 2011).*

* cited by examiner

*Primary Examiner* — Hassan Kizou
*Assistant Examiner* — Tejis Daya
(74) *Attorney, Agent, or Firm* — Oblon, McClelland, Maier & Neustadt, L.L.P.

(57) ABSTRACT

Disclosed is a method of wireless communication for use by a device and the associated device. The method includes receiving a data transfer schedule and determining that the data transfer schedule includes an isochronous traffic stream for the device. After the determining, the method includes extracting an allocation period of the isochronous traffic stream from the data transfer schedule, determining a wakeup schedule for the device having a sleep interval based on the allocation period, and entering a power save mode using the wakeup schedule. The method may further include determining that the data transfer schedule does not include an isochronous traffic stream for the device. After this determining, the method may include requesting a wakeup schedule of a source device, and determining the wakeup schedule for the device having the sleep interval based on the wakeup schedule for the source device entering a power save mode using the wakeup schedule for the device.

20 Claims, 11 Drawing Sheets

POWER MANAGEMENT FOR DATA TRANSFERS IN NETWORK DEVICES

BACKGROUND

In the field of wireless communications, high frequency operation allows for very high throughput in short-range wireless data transmissions over wireless data networks. However, as operating frequencies and data transfer rates increase, power consumption in wireless devices may become prohibitively high. To offset such increasing power consumption, the Wireless Gigabit Alliance (WGA) defines a power save (PS) mode by which a wireless device may "go to sleep" for one or more "doze" beacon intervals. In this mode a wireless device is not able to transmit or receive data and consumes very lower power.

Since power management is a critical factor in wireless devices, each wireless device in a wireless data network may choose an independent "sleep interval" for such a PS mode according to its own power consumption and traffic delivery requirements. The "sleep interval" of the PS mode is measured in the number of beacon intervals (BIs) between successive awake BIs. The longer the sleep interval, the lower the average power consumption of the wireless device. A sleep interval includes one or more "doze" BIs. However, it is difficult to enter a sleep interval without inadvertently losing data if data transfers are scheduled while the wireless device is dozing. The WGA specification does not propose a guideline for power savings in a wireless device that is busy transmitting and/or receiving data.

SUMMARY

The present disclosure is directed to power management for data transfers in network devices, substantially as shown in and/or described in connection with at least one of the figures, as set forth more completely in the claims.

DETAILED DESCRIPTION

Figure 1:
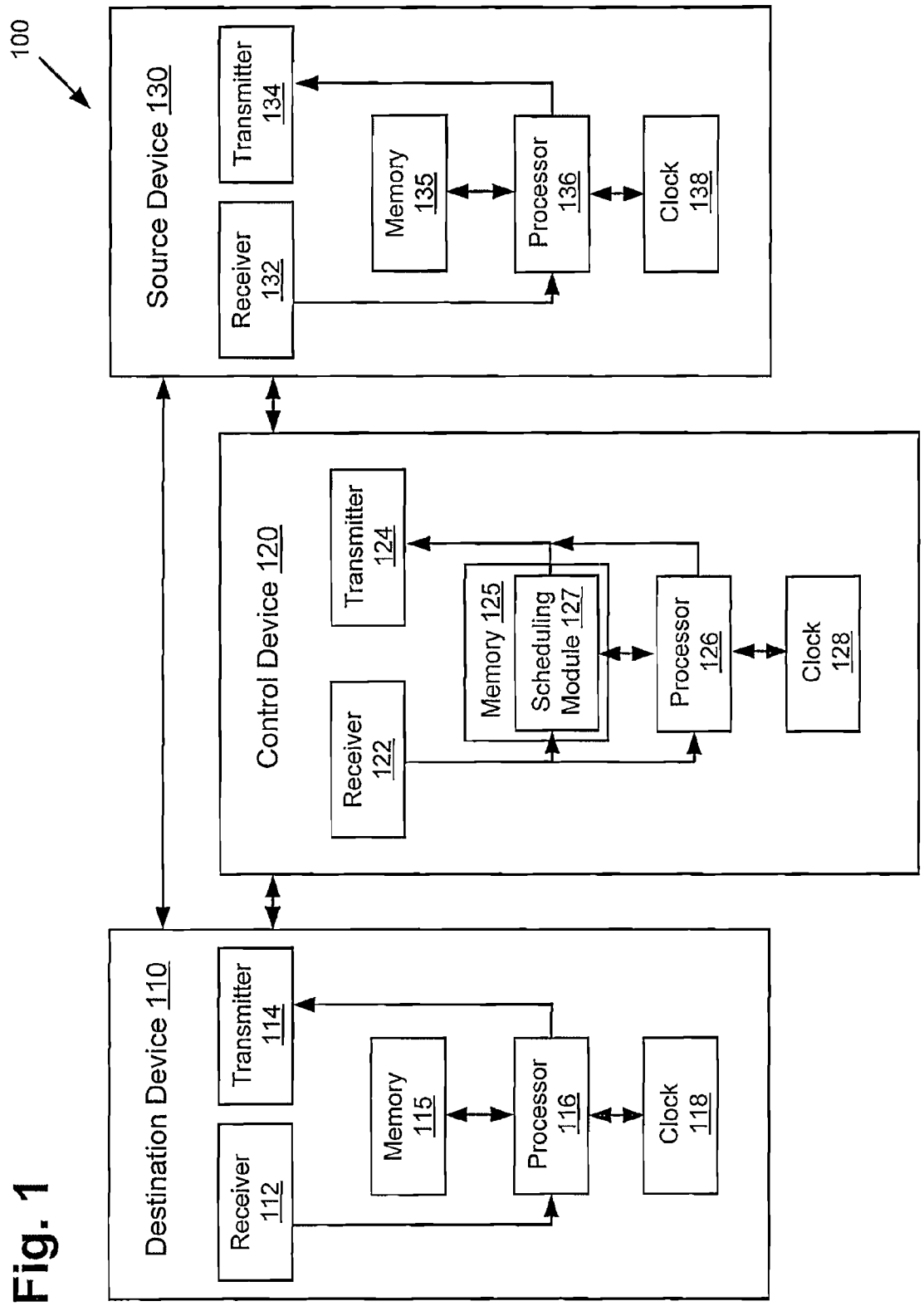
FIG. 1 presents an exemplary diagram of a system for power management during data transfers in network devices, according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

To enable high-speed data transfer in network devices, such as 60 GHz wireless devices, the WGA specification explicitly defines a requirement called a Traffic Specification (TSPEC) for handling and allocating timeslots for data transfer between high-speed wireless devices. The TSPEC may specify an "allocation period" over which an allocation repeats, a minimum allocation time and a maximum allocation time for each high-speed data transfer. Each complete data transfer is collectively called a "traffic stream" while each traffic stream further comprises one or more individual timeframes during which data is transferred, called service periods (SPs). In addition, data allocation may be classified as one of two types depending on the timing of the individual SP allocations: 1) isochronous, and 2) asynchronous. Isochronous allocations recur at the same target transmission time within each beacon interval regardless of whether the isochronous allocations occur in successive beacon intervals or not, whereas asynchronous allocations are not required to recur at the same target transmission time within beacon intervals. Accordingly, a wireless device may establish an isochronous allocation for data transfers requiring periodic access to the channel and for which allocated time is relatively constant. Contrarily, wireless devices may establish an asynchronous allocation where data transfers are not periodic or where short data transfers are required at random times.

In a conventional wireless network, a traffic stream is scheduled by a Control Device, for transmission between two or more wireless devices. A wireless device in the network may send a data request to the Control Device, defining the timing and traffic requirements of the data request. The Control Device determines whether to admit the data request and if admitted, the Control Device may then allocate one or more SPs and announce the SP allocations comprising the traffic stream to the one or more wireless devices involved in the data transfer.

FIG. 1 presents an exemplary diagram of a system for power management during data transfers in network devices, according to one implementation of the present application.

For example, system 100 is configured to include at least Destination Device 110, Control Device 120 and Source Device 130. Destination Device 110 may comprise receiver 112, transmitter 114, processor 116, memory 115 and clock 118, and may be configured to transmit and/or receive one or more timed data transmissions embedded within one or more beacon intervals. Receiver 112 may be connected to processor 116 and may be configured to receive timed data transmissions from another device, for example Control Device 120 and/or Source Device 130, in the form of SPs embedded in one or more beacon intervals. Transmitter 114 may also be connected to processor 116 and may be configured to transmit one or more timed data transmissions to another wireless device, such as Control Device 120 and/or Source Device 130. Memory 115 may be connected to processor 116 and may enable the storage of data, parameters and routines necessary for the operation of Destination Device 110. Clock 118 may be connected to processor 116 and may enable Destination Device 110 to track timing intervals necessary to the operation of one or more embodiments of the present invention.

Control Device 120 may represent an access point (AP) or personal basic service set control point (PCP), and is responsible for coordinating the scheduling of all timed data transfers in system 100. Control Device 120 may comprise receiver 122, transmitter 124, memory 125 comprising scheduling module 127, processor 126, and clock 128. Receiver 122 may be connected to processor 126 and may be configured to receive timed data transmissions in the form of SPs embedded in one or more beacon intervals from another device, such as Destination Device 110 and/or Source Device 130. Transmitter 124 may also be connected to processor 126 and may be configured to transmit one or more timed data transmissions to another device, such as Destination Device 110 and/or Source Device 130. Clock 128 may be connected to processor 126 and may enable Control Device 120 to track timing intervals necessary to the operation of one or more embodiments of the present invention. Scheduling Module 127, which may reside within memory 125 as a software routine, may be configured to optimally schedule timed data transmissions between Destination Device 110, Control Device 120 and Source Device 130 during one or more beacon intervals.

Source Device 130 may comprise receiver 132, transmitter 134, processor 136, memory 135 and clock 138, and may be configured to transmit and/or receive one or more timed data transmissions embedded within one or more beacon intervals.

Receiver 132 may be connected to processor 136 and may be configured to receive timed data transmissions from another device, for example Control Device 120 and/or Destination Device 110, during SPs embedded in one or more beacon intervals. Transmitter 134 may also be connected to processor 136 and may be configured to transmit one or more timed data transmissions to another device, such as Control Device 120 and/or Destination Device 110. Memory 135 may be connected to processor 136 and may enable the storage of data, parameters and routines necessary for the operation of Source Device 130. Clock 138 may be connected to processor 136 and may enable Source Device 130 to track timing intervals necessary to the operation of one or more embodiments of the present invention.

Control Device 120 may schedule each data transmission allocation as an SP, where transmission over the channel during a particular BI is to a particular device, such as from Source Device 130 to Destination Device 110. Control Device 120 may alternatively schedule data transmissions for multiple devices during the same BI, in a Contention-Based Access Period (CBAP). Once data transfers are scheduled, Control Device 120 may transmit an Extended Schedule Information Element, including the schedule for all data transmissions to all associated devices, for example, Destination Device 110 and Source Device 130.

Figure 2:
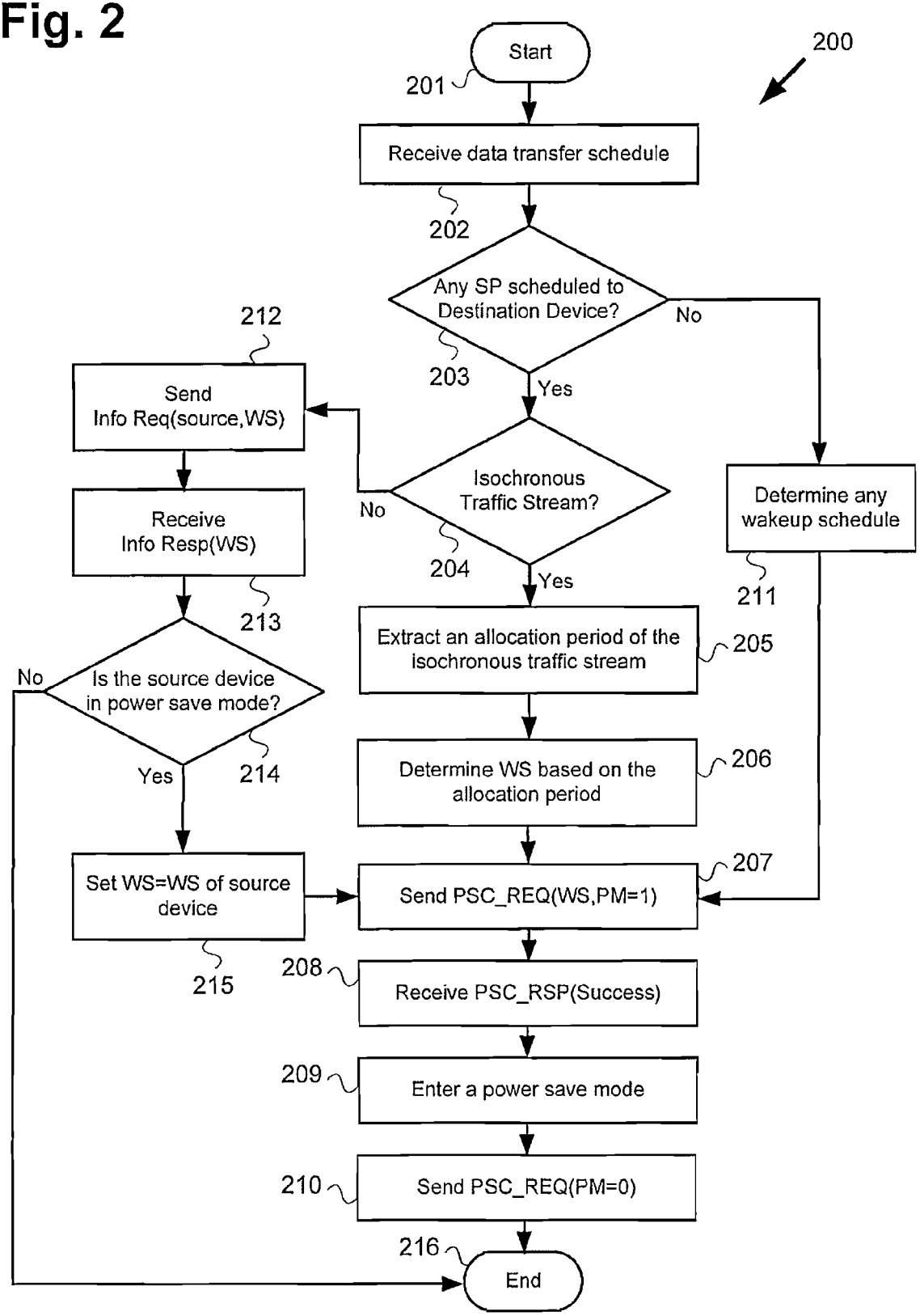
FIG. 2 presents an exemplary flowchart illustrating a method for power management during data transfers in network devices, according to one implementation of the present application.

FIG. 2 presents an exemplary flowchart illustrating a method for power management during data transfers in network devices, according to one implementation of the present application. If data traffic scheduled for transmission from Source Device 130 to Destination Device 110 is isochronous, Destination Device 110 may enter a PS mode having a sleep interval based on the allocation period of the isochronous traffic stream. For example, Destination Device 110 may enter an "awake state" during BIs that Source Device 130 is scheduled to transmit the isochronous traffic, and enter a "doze" BI during the remaining BIs. Portions of flowchart 200 may correspond to FIG. 3, which presents timing diagram 300, including eight (8) consecutive BIs, representative of a method for power management during data transfers in network devices, according to one implementation of the present application.

Flowchart 200 may begin with Start 201 and may proceed to action 202 including receiving a data transfer schedule. The data transfer schedule may comprise an Extended Schedule Information Element containing a schedule for each data transfer currently scheduled, as described above. The schedule may be received by Destination Device 110, for example.

Flowchart 200 may then proceed to action 203 where a determination as to whether any SP is currently scheduled to Destination Device 110. If no traffic is currently scheduled for Destination Device 110, the method may continue with action 211, where any wakeup schedule may be determined for a PS mode of Destination Device 110. However, if an SP is currently scheduled to Destination Device 110, the method may continue to action 204.

Figure 3:
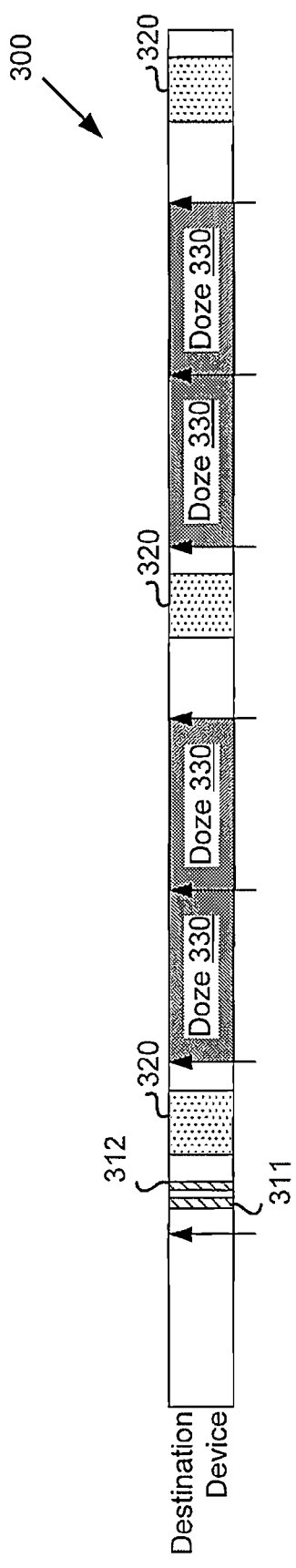
FIG. 3 presents a timing diagram representative of a method for power management during data transfers in network devices, according to one implementation of the present application.

Action 204 may include determining whether the SP scheduled is part of an isochronous traffic stream. If the SP is part of an isochronous traffic stream, flowchart 200 moves to action 205, which includes extracting the allocation period of the isochronous traffic stream. For example, Destination Device 110 may extract the allocation period from the Extended Schedule Information Element received from Control Device 120 in action 202. Action 206 may include determining a wakeup schedule for Destination Device 110 having a sleep interval based on the allocation period such that Destination Device 110 enters a sleep mode during BIs in which the isochronous traffic stream is not scheduled for transmission. Timeline 300 of FIG. 3 illustrates an isochronous traffic allocation including SPs 320, having an allocation period of two (2) BIs in that there are 2 BIs between adjacent instances of SP 320.

From either action 206 or action 211, flowchart 200 continues to action 207. Action 207 may include sending, to Control Device 120, a PS mode request frame having a wakeup schedule matching the allocation period of the isochronous traffic stream. Such a request may also include a power management bit having a value indicative of being enabled, for example, PSC_REQ(WS,PM=1). FIG. 3 illustrates such a request frame as PS mode request frame 311.

However, in order to enter the PS mode Destination Device 110 must receive a response from Control Device 120 indicating a successful receipt and allowance of the PS mode schedule as requested. Action 208 includes receiving such a PS mode response from Control Device 120, for example, PSC_RSP(Success). FIG. 3 illustrates such a response frame as PS mode response frame 312.

Once a successful response is received, Destination Device 110 may enter a PS mode as shown by action 209. FIG. 3 illustrates such a PS mode having a sleep interval equal to the allocation period of the source device, two (2) BIs, as shown by Doze BIs 330. During the doze BIs, Destination Device 110 may be in a low power state.

At some future time, when Destination Device 110 may wish to exit the PS mode, Destination Device 110 may send a PS mode request frame having a power management field value indicative of being disabled, as shown in action 210. For example, Destination Device 110 may send a PSC_REQ (PM=0) frame, which may notify Control Device 120 that Destination Device 110 is no longer in a PS mode.

The above method may be utilized where an allocation for data transfer to Destination Device 110 is isochronous or pseudo-static. However, if traffic is not isochronous, scheduling module 125 of Control Device 120 may potentially schedule new traffic streams to Destination Device 110 at any time during future beacon intervals. Thus, future SP allocations will not necessarily be periodic. In this case, sleep intervals for a PS mode of Destination Device 110 cannot be based on the allocation period of Source Device 130 alone without running the risk of losing data transmitted to Destination Device 110 during the sleep intervals. However, because Source Device 130 is transmitting the data, Source Device 130 may enter a PS mode at any time so long as it notifies Control Device 120 of the associated wakeup schedule. In such a case, scheduling module 125 of Control Device 120 would only schedule SPs for data transmission to or from Source Device 130 during BIs that Source Device 130 is awake. Thus, the present application also describes entering a PS mode for Destination Device 110 based on a previously established wakeup schedule for Source Device 130. Portions of flowchart 200 discussed below may correspond to FIG. 4, which presents source device timing diagram 400 and destination device timing diagram 450, each related to a method for power management during data transfers, according to another implementation of the present application.

If data traffic scheduled for transmission from Source Device 130 to Destination Device 110 is determined not to be isochronous, at action 204, Destination Device 110 may request a wakeup schedule of Source Device 130 from Control Device 120. For example, action 212 includes sending an information request frame for the source device's wakeup schedule (Info Req(source, WS)) to the control device.

Figure 4:
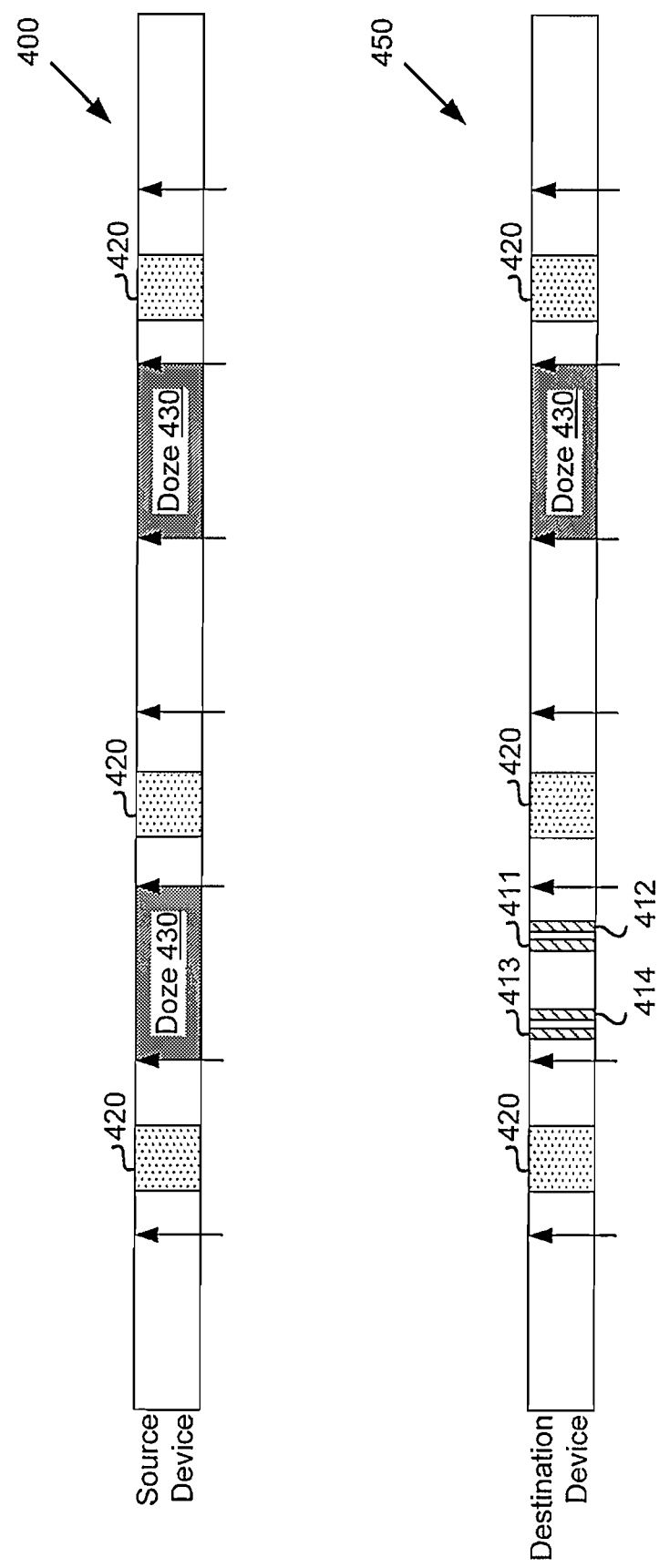
FIG. 4 presents timing diagrams representative of a method for power management during data transfers in network devices, according to another implementation of the present application.

In FIG. 4, timeline 400 may include SPs 420, representative of an asynchronous traffic allocation for transmission by Source Device 130, while timeline 450 includes SPs 420, representative of the asynchronous traffic allocation for reception by Destination Device 130. Timeline 450 of FIG. 5 further includes Info Request Frame 413.

If Source Device 130 is in a PS mode, Control Device 120 will have been previously notified of the associated wakeup schedule. Consequently, Control Device 120 will send an information response frame including the wakeup schedule for Source Device 130 (Info Resp(WS)), which is received by Destination Device 110, according to action 213. Timeline 450 of FIG. 4 illustrates Info Response Frame 414.

Thus, if an information response frame including a wakeup schedule is received by Destination Device 110, the determination that Source Device 130 is in a PS mode may be made at action 214. In such a case, Destination Device 110 may determine a wakeup schedule for itself having a sleep interval based on the wakeup schedule for Source Device 130 such that both devices enter a sleep mode during the same beacon intervals. Once this wakeup schedule is determined, Destination Device 110 may enter a PS mode having the same wakeup schedule as Source Device 130 utilizing actions 207-209 as described above. FIG. 4 illustrates Doze BIs 430 within source device timeline 400, which are indicative of the current PS mode of Source Device 130. As shown in destination device timeline 450, PS mode request frame 411 is sent, and PS mode response frame 412 is then received. From this point forward, Destination Device 110 may enter a sleep mode during the same BIs as Source Device 130.

At an appropriate time Destination Device 110 may exit the PS mode as described above regarding action 210. The method of flowchart 200 may finish at End 216.

The above-described method may be utilized where a source device is scheduled to transmit asynchronous data traffic to a destination device and the source device is currently in a PS mode. However, the present application additionally contemplates a method by which a destination device may enter a PS mode if the source device is not yet in a PS mode and the scheduled data traffic is asynchronous, or CBAP based. One useful application for such a method may be within a battery-operated destination device where the battery has little power remaining and the destination device needs to enter a PS mode as soon as possible.

According to the WGA specification, there may be one or more CBAPs in a BI. An awake window is present within the first CBAP within a BI. If a device receives an Announcement Traffic Indication Message (ATIM) frame during the awake window, that device then sends an acknowledge (ACK) frame. A device may only transmit data to its destination after it has received an ACK frame for the ATIM frame. Thus, if a destination device enters a PS mode while the source device is sending data, the source device may not be aware of the transition to PS mode. Thus, the source device will waste power by sending ATIM frames to the destination device while the destination device is "sleeping" because the ATIM frames will not be acknowledged and the source device will continually send ATIM frames in each BI in an attempt to transmit the data.

Figure 5:
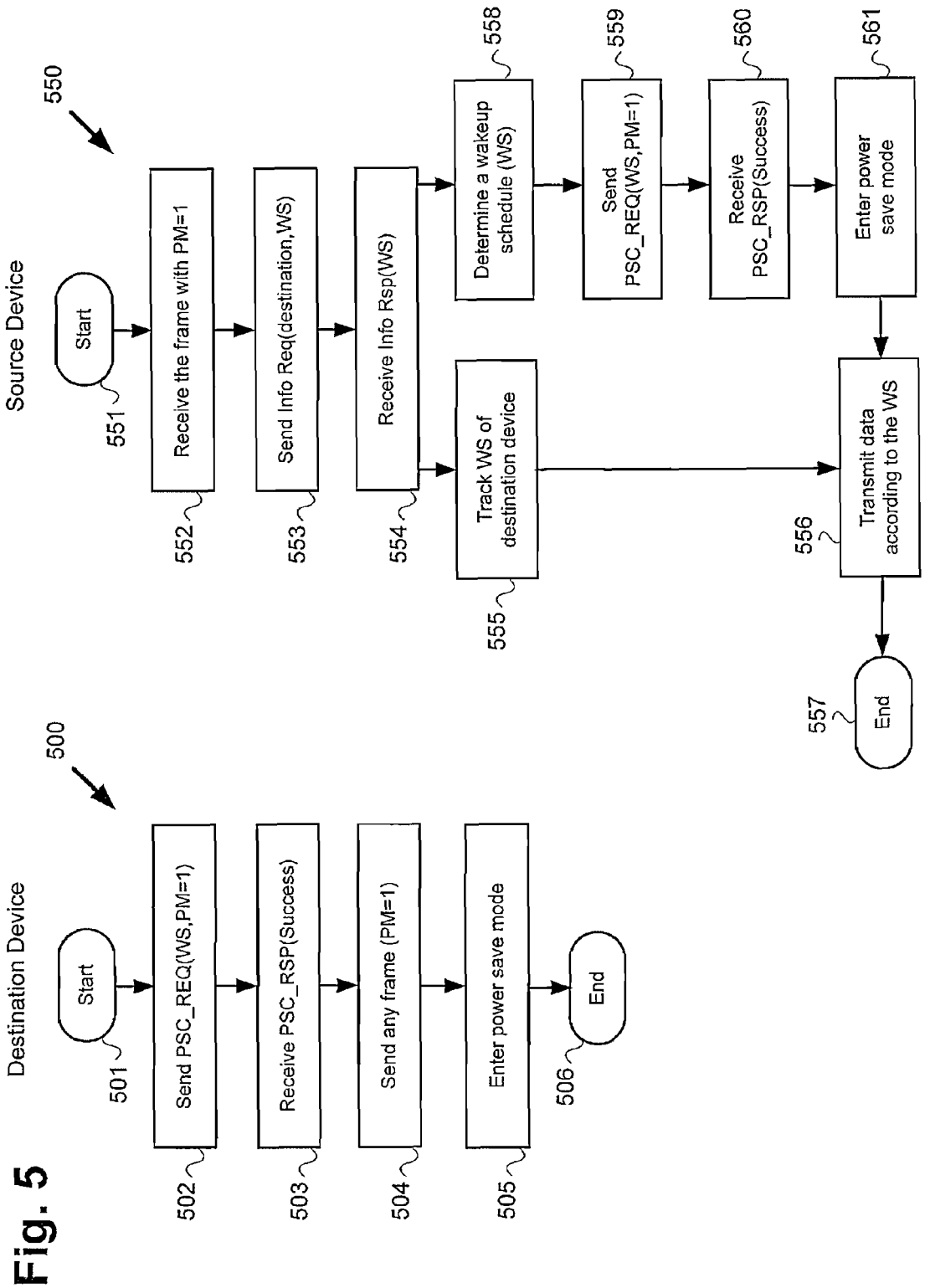
FIG. 5 presents exemplary flowcharts illustrating a method for power management during data transfers in network devices, according to another implementation of the present application.

FIG. 5 presents exemplary flowcharts illustrating a method for power management during data transfers in network devices, according to another implementation of the present application. Flowchart 500 illustrates actions taken by a destination device, while flowchart 550 illustrates actions taken by a source device. Flowchart 500 may correspond to destination device timeline 600 of FIG. 6. Likewise, flowchart 550 may correspond to source device timelines 650 and/or 675 of FIG. 6.

Each of timelines 600, 650 and 675 may represent asynchronous data transmitted within CBAPs during awake windows of each BI. In each of timelines 600, 650, and 675 each BI may comprise CBAP 660 during which data traffic may be communicated between source device and destination device. In addition, each of timelines 600, 650 and 675 include ATIM frames 616 sent from the source device and received by the destination device to notify the destination device that data from the source device is ready for transfer. Each timeline also includes ACK frames 617, each sent from the destination device and received by the source device acknowledging receipt of a previous ATIM frame 617. Data 620 are communicated from the source device to the destination device after receipt of a respective ACK frame.

Figure 6:
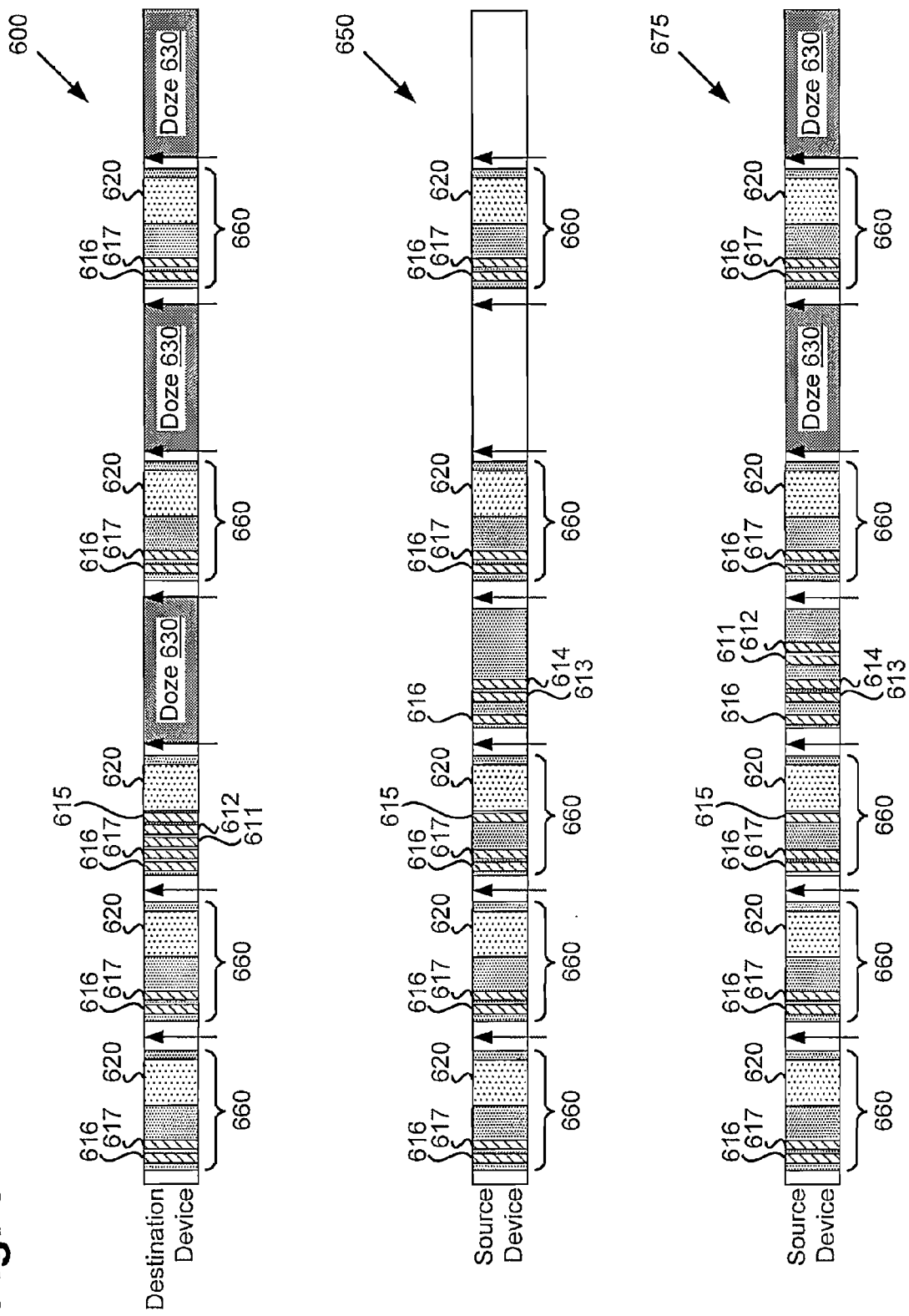
FIG. 6 presents timing diagrams representative of a method for power management during data transfers in network devices, according to another implementation of the present application.

Turning back to FIG. 5, at both Start 501 and Start 551 neither the destination device nor the source device are in a PS mode. Flowchart 500 begins with Start 501. Action 502 includes the destination device sending a PS mode request frame including a wakeup schedule and a power management field having a value indicative of being enabled, i.e., PSC_REQ(WS,PM=1). FIG. 6 illustrates PS mode request frame 611 in the third BI of timeline 600. In contrast to the previous examples, here the destination device may determine the wakeup schedule in any manner because the destination device is not necessarily entering a PS mode in reaction to any condition of the source device. If the PS mode request is accepted by the control device, action 503 includes receiving a PS mode response frame indicating acceptance of the PS mode request by the control device, i.e., PSC_RSP (Success). FIG. 6 illustrates PS mode response frame 612 in the third BI of timeline 600.

Because PS mode request frame 611 from the destination device is addressed to the control device, the source device may still be unaware of the transition to a PS mode. Thus, in action 504, the destination device notifies the source device of the transition to PS mode by sending any frame having a power management value indicative of being enabled to the source device, i.e., (PM=1). FIG. 6 illustrates PM=1 frame 615 sent from the destination device to the source device in timelines 600 and 650. According to action 505, the destination device may then enter a PS mode where the destination device may be asleep during "doze" BIs 630. Data may then be transmitted according to the wakeup schedule of the destination device.

Flowchart 550 illustrates actions taken by a source device and begins at Start 550. Once the frame having PM=1 is sent by the destination device at action 504 of flowchart 500, the source device may receive the frame having PM=1 in action 552. FIG. 6 illustrates received PM=1 frame 615 in the third BI of timeline 650. The source device may then request the wakeup schedule of the destination device by sending an information request frame to the control device in action 553. Action 554 may then include receiving an information response frame containing the wakeup schedule of the destination device from the control device. FIG. 6 illustrates Info Request Frame 613 and Info Response Frame 614 in the fourth BI of timeline 650. From this point the method illustrated by flowchart 550 may proceed one of two ways: via action 555 to action 556 and End 557, or via actions 558 through 561 to action 556 and End 557.

According to action 555, once the information response has been received, the source device may track the wakeup schedule of the destination device without itself entering PS mode and only send ATIM frames to the destination device during the destination device's awake BIs. Action 556 may follow including transmitting data according to the WS of the destination device. The method may finish at End 557.

Alternatively, once the information response has been received, the source device may decide to enter PS mode and determine a wakeup schedule based on the wakeup schedule of the destination device in action 558. The method continues with action 559 including sending a PS mode request frame, i.e., PSC_REQ(WS,PM=1), to the control device to initiate a PS mode having the same wakeup schedule as the destination device. If the control device accepts the PS mode request, the source device may receive a PS mode response frame indicating a successful PS mode request, i.e., PSC_RSP(Success), according to action 560. FIG. 6 illustrates PS mode request frame 611 and PS mode response frame 612 within the fourth BI of timeline 675. Timeline 650 does not include Doze BIs since the source device does not enter PS mode, according to the method including actions 555 and 556 of flowchart 550 in FIG. 5. Timeline 675 includes the addition of PS mode request frame 611 and PS mode response frame 612 followed by doze BIs in the $6^{th}$ and $8^{th}$ BIs. After receiving the PS mode response frame, the source device may follow action 561 and enter a PS mode having the same wakeup schedule as the destination device and send ATIM frames to the destination device during awake BIs. As stated above, once an ACK frame is received in response to a transmitted ATIM frame, the source device may transmit data to the destination device according to the wakeup schedule of the destination device such that data is transmitted during BIs in which the destination device is not sleeping, at action 556. The method may finish at End 557.

In the example discussed above regarding FIGS. 5 and 6, the destination device includes a start time for the PS mode to be an immediately following BI in action 502 of flowchart 500. This can be seen by the first doze BI 630 located in the immediately following BI from the PS mode request frame 611 and PS mode response frame 612. However, as shown by timelines 650 and 675 the source device may still waste energy associated with sending ATIM frame 616 in the fourth BI because it may take a finite amount of time for the source device to process the received PM=1 frame 615 and send and receive an information frame including the WS of the destination device.

Figure 7:
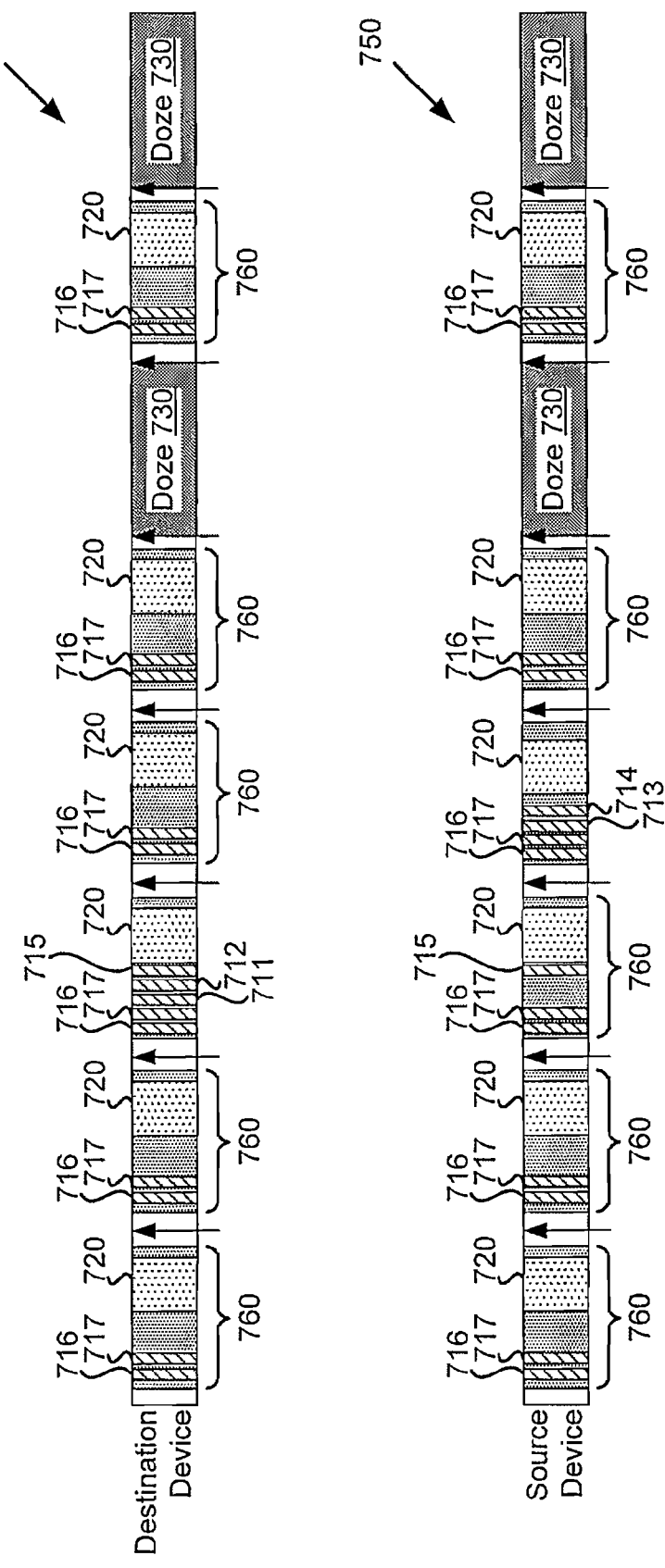
FIG. 7 presents timing diagrams representative of a method for power management during data transfers in network devices, according to another implementation of the present application.

To avoid the destination device going to sleep before the source device has time to register the transition to PS mode, the destination device may instead include a start time for the PS mode to be a predetermined number of BIs after the immediately following BI, in action 502 of flowchart 500. Thus, the source device will have enough time to receive the WS of the destination device from the control device after successful information request/response frame exchange before the destination device enters a first doze BI. This may be illustrated in FIG. 7, where timelines 700 and 750 are substantially identical to timelines 600 and 675, respectively, except for the fourth BI, and similar numerals denote similar elements as discussed above. For example, each BI may comprise CBAP 760 during which data traffic may be communicated between source device and destination device. In addition, each of timelines 700 and 750 may include ATIM frames 716. Each timeline also may include ACK frames 717. Furthermore, data 720 may be communicated from the source device to the destination device. The destination device sends PS mode request frame 711 and receives PS mode response frame 712 in the third BI of timeline 700. However, because the start time of the wakeup schedule has been set to 2 BIs after the immediately following BI, the first doze BI 730 does not occur for 2 more BIs, or in the sixth BI of timeline 700. Because the start time of the destination device's wakeup schedule is 2 BIs later, the source device has 2 BIs in which to receive PM=1 frame 715, send information request frame 713 and receive Info Response Frame 714. Thus, the destination device may operate in a "fake PS is mode" for the predetermined number of BIs between sending the PS mode request frame and/or separate PM=1 frame, and actually entering the first doze BI. The method may then proceed in either of the two manners described above regarding actions 555 through 561 of flowchart 500.

In order to ensure the destination device includes a start time for the PS mode of a predetermined number of BIs after the immediately following BI, the control device may reject any PS mode request frame having a starting time less than the predetermined number of BIs after the immediately following BI. In the case of such a rejection, the control device may send a PS mode response frame back to the destination device including a "reject" indication and a WS having a start time delayed by at least the predetermined number of BIs from the immediately following BI, i.e., PSC_RSP(Reject, Modified WS).

The immediately preceding method may avoid power wasting in the source device, however, it prevents the destination device from going to low power mode immediately because the destination device must wait the predetermined number of BIs before it may enter the PS mode. However, the latency introduced due to the source device retrieving the WS from the control device when the destination device goes to PS mode may be avoided without restricting the start time of the PS mode.

Figure 8:
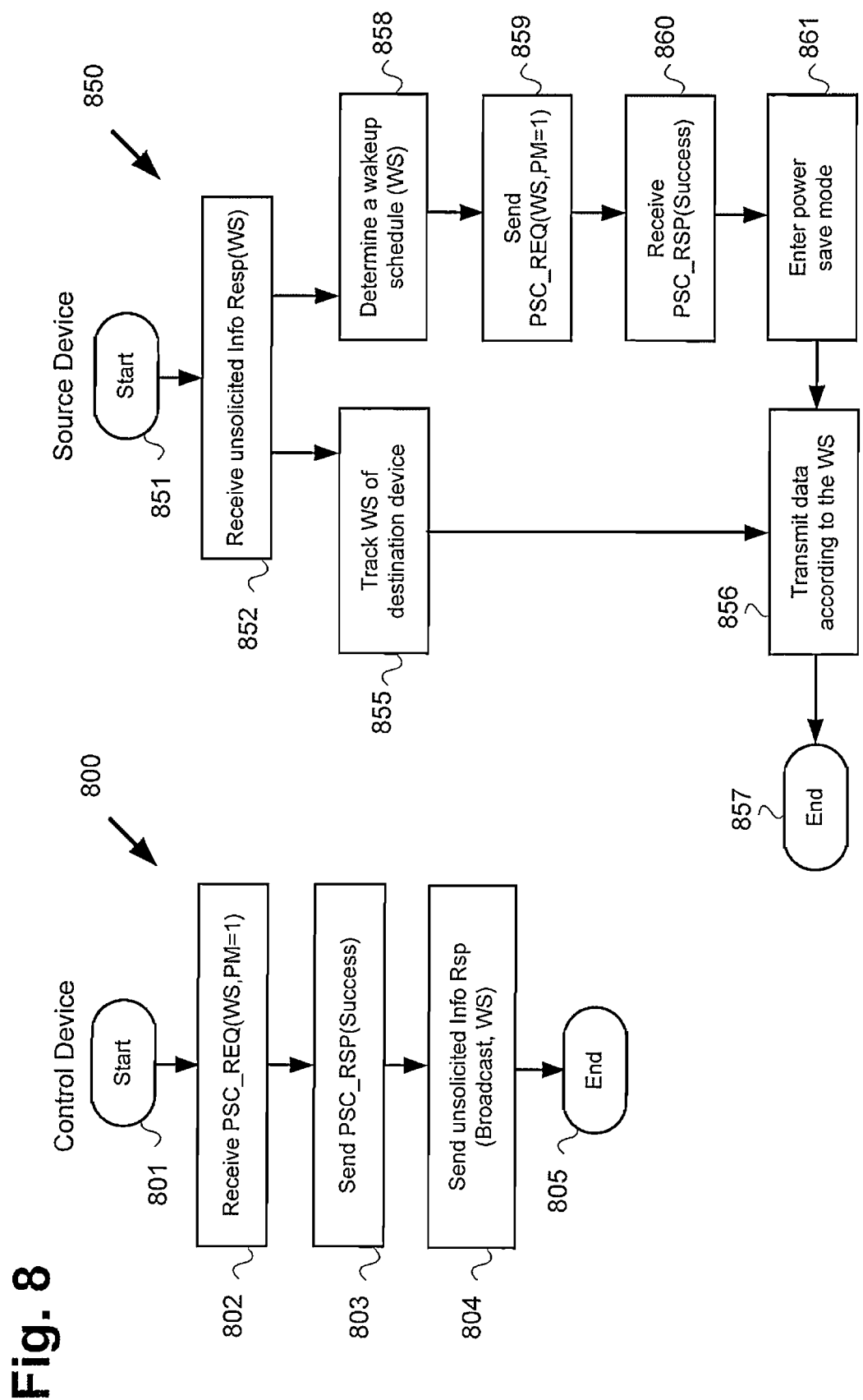
FIG. 8 presents exemplary flowcharts illustrating a method for power management during data transfers in network devices, according to another implementation of the present application.

FIG. 8 presents an exemplary flowchart illustrating a method for power management during data transfers in network devices, according to another implementation of the present application. Flowchart 800 illustrates actions taken by a control device, while flowchart 850 illustrates actions taken by a source device. In addition, flowchart 850 may correspond to source device timeline 950 and may relate to destination device timeline 900 of FIG. 9, which is representative of a method for power management during data transfers in network devices, according to one implementation of the present application. Timelines 900 and 950 may be substantially identical to timelines 700 and 750 of FIG. 7, respectively, with the exception of the third and fourth BIs of each timeline. Thus, similar numerals may relate to the same elements between FIGS. 7 and 9. For example, each BI may comprise CBAP 960 during which data traffic may be communicated between source device and destination device. In addition, each of timelines 900 and 950 may include ATIM frames 916. Each timeline also may include ACK frames 917. Furthermore, data 920 may be communicated from the source device to the destination device.

Figure 9:
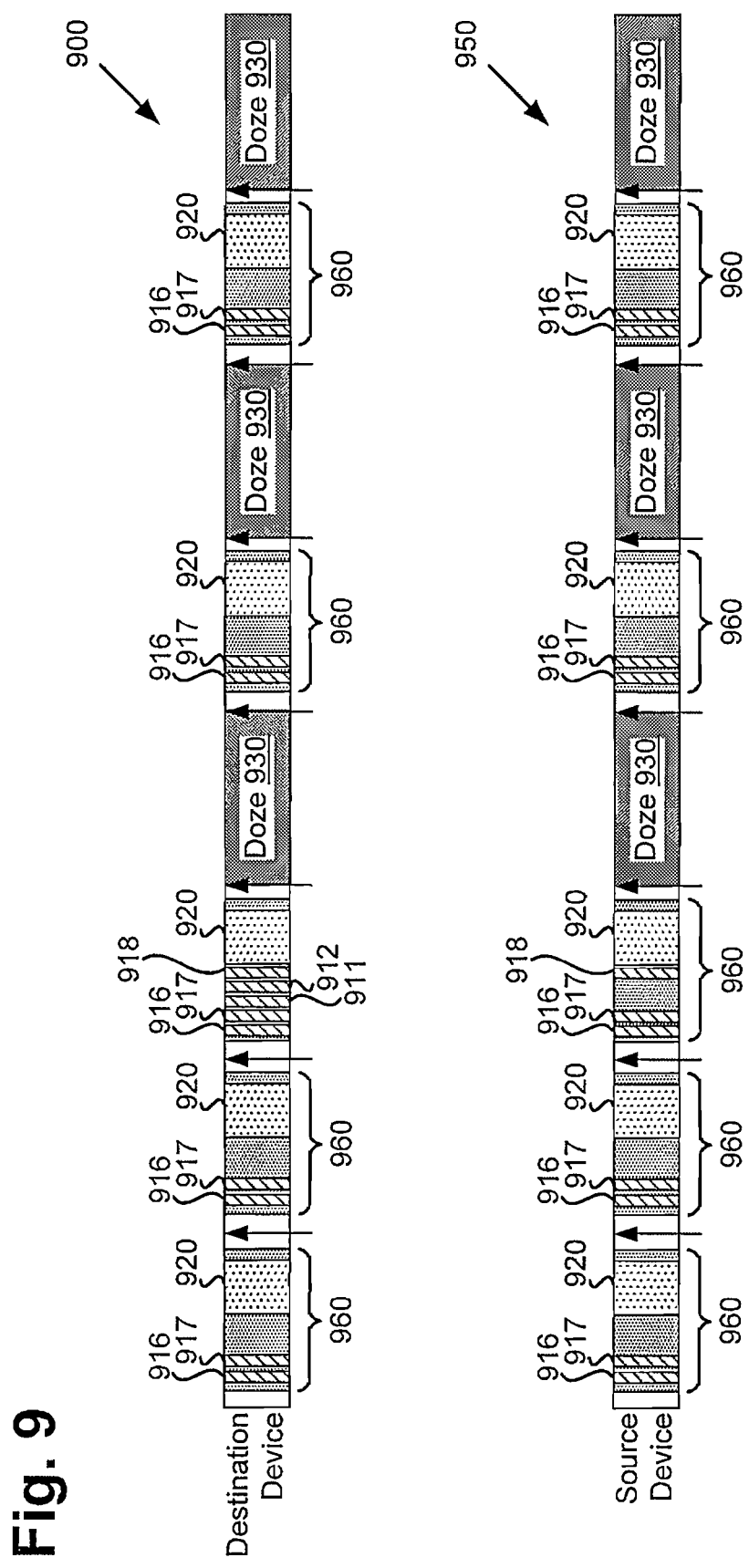
FIG. 9 presents timing diagrams representative of a method for power management during data transfers, according to another implementation of the present application in network devices.

Flowchart 800 may begin with Start 801. As stated above, the destination device may send a PS mode request frame to the control device indicating an intention to enter a PS mode. Action 802 shows the receipt of PSC_REQ(WS,PM=1). Once the control device receives the PS mode request frame, action 803 shows the control device sending the PS mode response frame having a value indicative of a successful PS mode request. The control device may then broadcast an unsolicited information response frame to each device within the network, or personal basic service set (PBSS). Action 804 shows sending unsolicited Info Resp(Broadcast, WS). Flowchart 800 may finish at End 805. Destination device timeline 900 of FIG. 9 illustrates transmitted PS mode request frame 911, received PS mode response frame 912, and received unsolicited Info Response Frame 918 in the third BI.

Flowchart 850 of FIG. 8 may begin at Start 851. Action 852 includes receiving the unsolicited Info Resp(WS), which may be further illustrated in the third BI of source device timeline 950 as received unsolicited Info Response Frame 918. Broadcasting the unsolicited information response frame to every device in the PBSS immediately notifies each device that a particular device is entering PS mode and announces the associated wakeup schedule. Accordingly, the source device need not inquire the WS from the control device and may begin following the WS to send ATIM frames and data traffic only during the destination device's awake BIs. Thus, the source device may track the WS of the destination device beginning in the BI immediately following the PSC_REQ/RSP exchange. From this point forward the method of flowchart 850 may proceed in one of two ways: via action 855 to action 856 and End 857, or via actions 858 through 861 to action 856 and End 857. Each of actions 855 through 861 are substantially identical to those of actions 556 through 561 as described above regarding FIG. 5. Thus, FIGS. 8 and 9 illustrate an implementation in which a destination device is not limited as to what start time of a PS mode is appropriate in light of source device latency as described above. As described above regarding timelines 650 and 675 of FIG. 6, timeline 950 will have doze BIs (930) in the $4^{th}$, $6^{th}$ and $8^{th}$ BIs only if the source device itself is entering PS mode. If, instead, the source device merely tracks the wakeup schedule of the destination device, the $4^{th}$, $6^{th}$ and $8^{th}$ BIs of timeline 950 will not be doze BIs.

Figure 10:
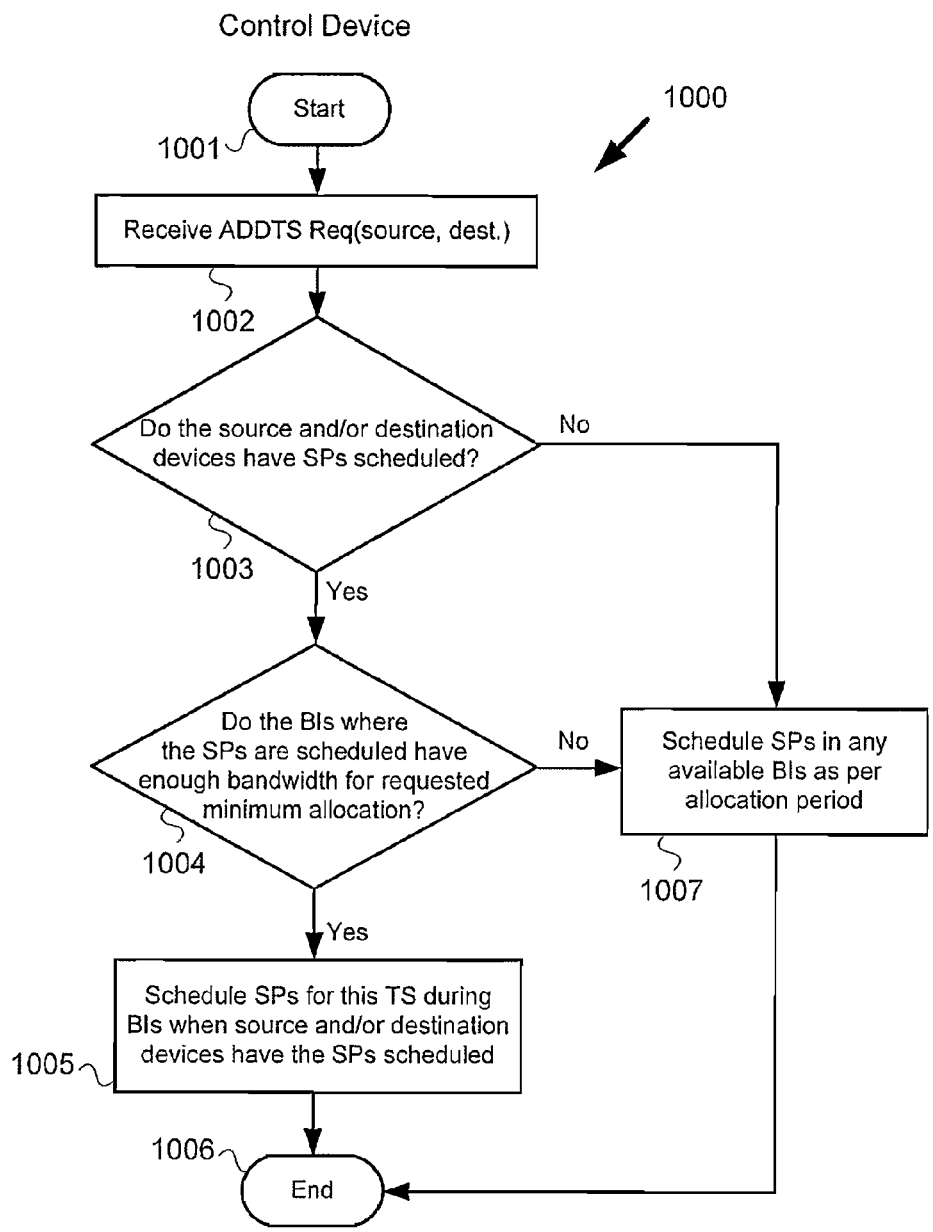
FIG. 10 presents an exemplary flowchart illustrating a method for power management during data transfers, according to another implementation of the present application in network devices.
Figure 11:
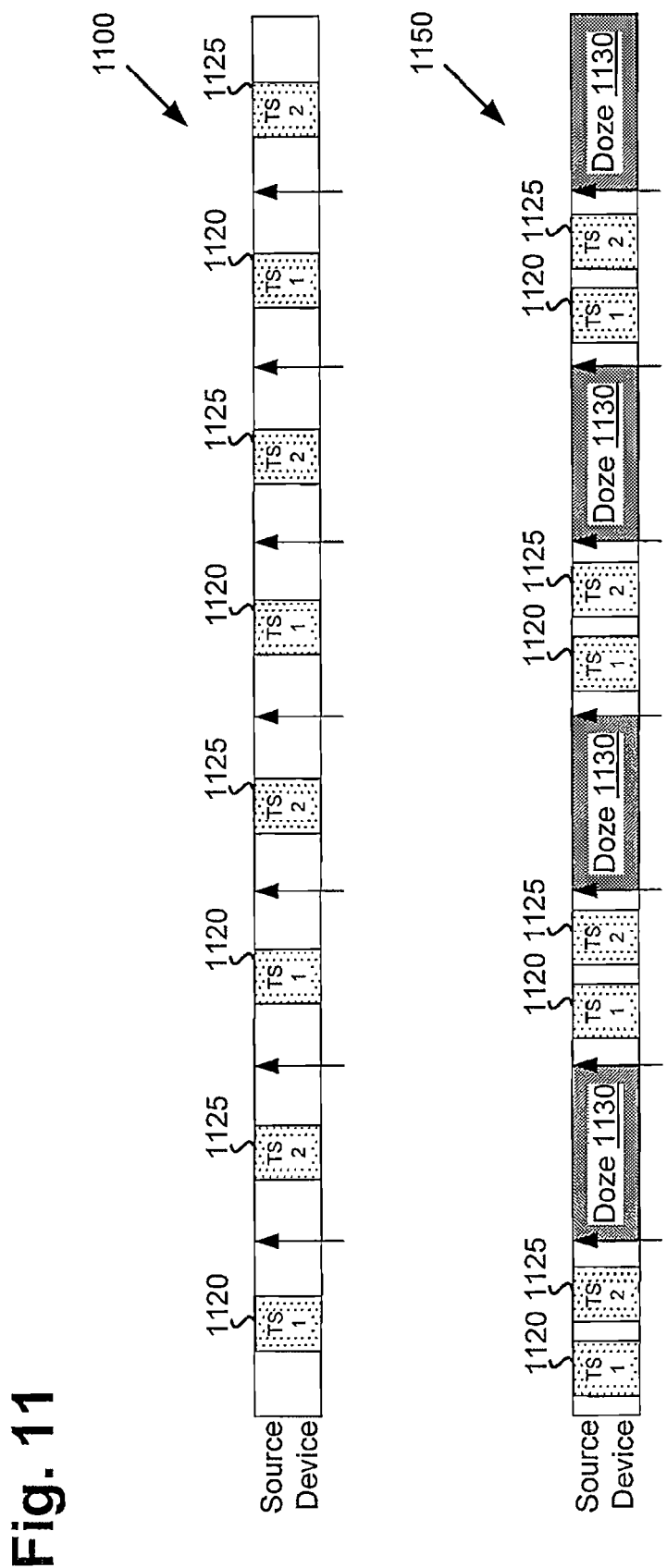
FIG. 11 presents timing diagrams representative of a method for power management during data transfers in network devices, according to another implementation of the present application.

FIGS. 10 and 11 relate to a method for power management during data transfers in network devices, according to another implementation of the present application. This method enables devices to reduce power consumption by proposing scheduling guidelines for the control device so that associated devices may designate a greater number of doze BIs than when using conventional scheduling guidelines.

Though a particular device may doze during certain portions of awake BIs, a device will save more power in a doze 131 compared to any awake BI because the device may doze for an entire doze 131 but must maintain an awake state during at least the beacon target time (BTT), announcement time (AT) and the CBAP window of awake BIs. Thus, the greater the proportion of doze BIs to awake BIs for a device, the greater the potential power savings. Because all scheduling is handled by the control device, the control device may schedule SPs in such a way as to reduce the number of BIs in which any device has at least one scheduled SP by attempting to schedule SPs in BIs where a particular device is already either a source or destination of scheduled SPs.

FIG. 11 shows timeline 1100 including a first traffic stream TS1 comprising SPs 1120 and a second traffic stream TS2 comprising SPs 1125. Both SPs 1120 and SPs 1125 have an allocation period of 2 BIs, i.e., each repeats every other BI, with SPs 1120 scheduled in the odd BIs and SPs 1125 scheduled in the even BIs. Because the conventional scheduling of timeline 1100 results in each BI having at least one SP scheduled, the device may not have a doze BI during any of the illustrated BIs.

FIG. 10 presents an exemplary flowchart illustrating a method for power management during data transfers in network devices, according to another implementation of the present application. Flowchart 1000 may begin at Start 1001. Action 1002 may include receiving an add traffic stream request frame, i.e., ADDTS(source, destination). The method continues with action 1003, which includes making the determination as to whether the source and destination device have any SPs scheduled already. If the source and/or destination devices have one or more SPs already scheduled the method continues to action 1004 where a determination is made as to whether the BIs where the SPs are scheduled have enough bandwidth to accommodate the requested minimum allocation for the SPs of the new TS. If the source and destination device do not have previously scheduled SPs or the BIs where those SPs are previously scheduled do not have enough bandwidth remaining to accommodate the new SPs, the method continues to action 1007 where the SPs are scheduled in any available BIs according to their allocation period. The method may then finish at End 1006.

However, if enough bandwidth is available to schedule the new SPs in the BIs where SPs are already scheduled, at action 1004, the method may continue to action 1005, where SPs of the new TS are scheduled during BIs when either the source device or the destination device have previously scheduled SPs. The method may then finish at End 1006.

Timeline 1150 of FIG. 11 illustrates the outcome of the method shown by flowchart 1000 for a source device. For example, assuming traffic stream TS1, having SPs 1120 in the odd BIs, is the first traffic stream scheduled. When the control device receives a request to add traffic stream TS2 with an allocation period of 2 BIs, the control device may determine that the source device already has SPs 1120 scheduled in the odd BIs. Next, the control device may determine that there is bandwidth available in each of the odd BIs to schedule SPs 1125 of TS2. Because the allocation periods of TS1 and TS2 are the same, if the first SP of TS2 is scheduled in a BI with an SP 1120 from TS1, all SPs on TS2 may be scheduled in BIs having SPs 1120. Thus each of SPs 1125 may be scheduled after SPs 1120 in each of the odd BIs of timeline 1150. In this example, each of the even BIs, i.e., BIs where no SPs are currently scheduled, may be scheduled as doze BIs 1130 in a subsequent request to enter a PS mode. In this manner, the source device may be enabled to lower its average power consumption to a greater degree that using conventional scheduling methods. Thus, the present application provides one or more methods for power management during data transfers in network devices.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for wireless communication, the system comprising:
    a control device including one or more circuits that are configured to:
        determine whether a power save mode request is accepted or rejected based on a number of beacon intervals provided in the power save mode request is equal to or greater than a predetermined number of beacon intervals;
    a destination device including one or more circuits that are configured to:
        transmit the power save mode request to the control device, the power save mode request at least including a wakeup schedule of the destination device; and
        enter a power save mode when the transmitted power save mode request is accepted by the control device, wherein
        a starting time for the power save mode of the destination device is set to be at least the predetermined number of beacon intervals after a received acceptance response from the control device; and
    a source device including one or more circuits that are configured to:
        transmit a request to the control device to obtain the wakeup schedule of the destination device; and
        enter a power save mode based on the obtained wakeup schedule, wherein
        a starting time for the power save mode of the source device begins at a same time as the starting time for the power save mode of the destination device.

2. The system according to claim 1, wherein
in a case where the power save mode request from the destination device is rejected, the one or more circuits of the control device is further configured to send a response that includes a modified wakeup schedule and a rejection indication.

3. The system according to claim 2, wherein the modified wakeup schedule has a starting time delayed based on the predetermined number of beacon intervals.

4. The system according to claim 1, wherein
in a case where the number of beacon intervals provided in the power save mode request from the destination device is equal to or greater than the predetermined number of beacon intervals, the one or more circuits of the control device is configured to transmit a response to the destination device that the power save mode request is accepted; and
in a case where the number of beacon intervals provided in the power save mode request from the destination device is less than the predetermined number of beacon intervals, the one or more circuits of the control device is configured to transmit a response to the destination device that the power save mode request is rejected.

5. The system according to claim 1, wherein the predetermined number of beacon intervals is at least two.

6. The system according to claim 1, wherein the predetermined number of beacon intervals is two.

7. The system according to claim 1, wherein the number of beacon intervals provided in the power save mode request is two.

8. The system according to claim 1, wherein the one or more circuits of the source device is configured to transmit data to the destination device based on the wakeup schedule of the destination device.

9. The system according to claim 1, wherein the source device and the destination device always enter the power save mode at same beacon intervals, the beacon intervals being defined with respect to time.

10. The system according to claim 1, wherein the one or more circuits of the source device is configured to receive the wakeup schedule of the destination device prior to the destination device entering the power save mode.

11. The system according to claim 1, wherein the one or more circuits of the destination device is configured to transmit a notification to the source device after the received acceptance response from the control device, the notification indicating that the destination device is entering the power save mode.

12. The system according to claim 1, wherein the destination device enters the power save mode for at least an entire beacon interval.

13. The system according to claim 1, wherein the source device enters the power save mode for at least an entire beacon interval.

14. The system according to claim 1, wherein the transmitted power save mode request further includes information relating to a power management field.

15. The system according to claim 14, wherein the power management field includes a value indicated as being enabled.

16. A wireless communication method for a system including a control device, a destination device, and a source device, the method comprising:
    determining, by the control device, whether a power save mode request is accepted or rejected based on a number of beacon intervals provided in the power save mode request is equal to or greater than a predetermined number of beacon intervals;
    transmitting, by the destination device, the power save mode request to the control device, the power save mode request at least including a wakeup schedule of the destination device;
    entering, by the destination device, a power save mode when the transmitted power save mode request is accepted by the control device, wherein a starting time for the power save mode of the destination device is set to be at least the predetermined number of beacon intervals after a received acceptance response from the control device;

transmitting, by the source device, a request to the control device to obtain the wakeup schedule of the destination device; and entering, by the source device, a power save mode based on the obtained wakeup schedule, wherein a starting time for the power save mode of the source device begins at a same time as the starting time for the power save mode of the destination device.

17. The method according to claim 16, further comprising:

sending, by the control device, a response that includes a modified wakeup schedule and a rejection indication, in a case where the power save mode request from the destination device is rejected.

18. A device for wireless communication, the device comprising:

one or more circuits configured to:

transmit a power save mode request to a control device, the power save mode request at least including a wakeup schedule of the device; and enter a power save mode when the transmitted power save mode request is accepted by the control device, wherein a starting time for the power save mode of the device is set to be at least a predetermined number of beacon intervals after a received acceptance response from the control device;

the starting time for the power save mode of the device begins at a same time as a starting time for a power save mode of a source device; and the power save mode request is accepted when a number of beacon intervals provided in the power save mode request is equal to or greater than the predetermined number of beacon intervals.

19. The device according to claim 18, wherein the predetermined number of beacon intervals is two.

20. The device according to claim 18, wherein the predetermined number of beacon intervals is at least two.

* * * * *